United States Patent

Fretz, Jr. et al.

[11] Patent Number: 5,116,684
[45] Date of Patent: May 26, 1992

[54] COMPOSITE OPHTHALMIC LENS

[75] Inventors: Edward R. Fretz, Jr., Corning; Anthony R. Olszewski, Bath, both of N.Y.

[73] Assignee: Corning Incorporated, Corning, N.Y.

[21] Appl. No.: 589,403

[22] Filed: Sep. 28, 1990

[51] Int. Cl.⁵ .......................... B32B 27/38; G02C 7/10
[52] U.S. Cl. ..................................... 428/417; 428/426; 428/913; 428/428; 428/323; 264/1.7; 264/212
[58] Field of Search .................. 428/417, 426

[56] References Cited

U.S. PATENT DOCUMENTS 4,432,832  2/1984  Fantone ............................ 428/417
4,756,972  7/1988  Kloosterboer et al. ............. 428/417

Primary Examiner—P. C. Sluby
Attorney, Agent, or Firm—Milton M. Peterson; Clinton S. Janes, Jr.

[57] ABSTRACT

An improvement in the epoxy plastic element of a laminated, glass-plastic, ophthalmic lens structure, and a method of effecting the improvement, are disclosed. The improved element is cast from a casting mix in which the ingredients are maintained in certain relationships to each other to provide an optically clear casting essentially free of striations. The cast material is gelled at a low temperature not over about 100° C., and may then be cured at a temperature up to 200° for a period of at least two hours.

15 Claims, 1 Drawing Sheet

COMPOSITE OPHTHALMIC LENS

FIELD OF THE INVENTION

The field is glass-plastic, laminated, ophthalmic lenses wherein the plastic component is an optically clear, rigid, epoxy casting.

BACKGROUND OF THE INVENTION

U.S. Pat. No. 4,793,703 (Fretz, Jr.) describes a three-layer, glass-plastic, laminated, ophthalmic lens. That lens is composed of (1) an inorganic glass element, preferably photochromic glass, (2) a layer of a rigid, organic plastic and (3) an interlayer of flexible, organic adhesive, either thermosetting or thermoplastic. The plastic layer is selected to provide a coefficient of thermal expansion in the range of $200-700 \times 10^{-7}/°$ C. This alleviates severe stress conditions that tend to develop with higher expansion plastics, such as CR-39, marketed by PPG Industries, Pittsburgh, Pennsylvania.

A copending application, Ser. No. 07/325,880, was filed Mar. 20, 1989, now U.S. Pat. No. 5,084,712, in the name of E.R. Fretz, Jr. and assigned to the assignee of the present application. That application discloses an improved laminated lens wherein each of the three layers has reactive groups on its surface to provide improved bonding between the layers. The application may employ a rigid, epoxy layer described as "an anhydride cured epoxy, for example, a mixture of cycloaliphatic and aromatic epoxy resins cured by cycloaliphatic anhydrides such as hexahydro phthalic anhydride."

An epoxy resin system has many advantages as a material for the plastic element in a laminated lens. These include low coefficient of thermal expansion and a high Tg, which favors stability during thermal processing. Also, this system does not smear or flow during grinding and polishing, and permits adjustment of the refractive index to match that of the glass element.

A critical requirement in a laminated lens, as in any ophthalmic lens, is optical clarity. A major obstacle, encountered in development of an epoxy optical system, is striations in the epoxy casting. Such striations are commonplace in standard epoxy processing procedures, and normally of no particular concern. However, they cannot tolerated in an optical system.

Striations in an epoxy casting are not readily apparent to the unaided eye, but may easily be observed by a shadow graph technique. There, a point light source is projected through a casting onto a white background. The striations appear as dark, irregular lines on the background.

It is thought that the striations occur during gelation of the epoxy, and are the result of an unsteady state of thermal equilibrium. Thermal gradients in the gel produce convection lines that become frozen in place and cannot be dispersed. This effect is compounded by the exothermic cure of the epoxy, and the poor heat transfer of the glass casting molds employed.

Efforts to correct the problem by the common homogenizing practice of stirring, both manually and mechanically, were unsuccessful. Equally ineffective were such techniques as manipulating viscosity and/or reaction rate in the resin, and increasing heat transfer through the mold.

PURPOSES OF THE INVENTION

A basic purpose is to provide an optically clear, epoxy polymer casting that is essentially free of striations, or distortions.

Another purpose is to provide an optically clear, epoxy polymer casting for assembly in a composite, glass-plastic, ophthalmic lens.

A further purpose is to provide a method of producing an optically clear, epoxy polymer casting that is essentially free of striations.

A still further purpose is to determine the conditions necessary to provide a stabilized, epoxy polymer casting process.

SUMMARY OF THE INVENTION

Pursuant to these and other apparent purposes, our invention contemplates a laminated, ophthalmic lens structure comprising an inorganic glass layer and a rigid, organic plastic layer wherein the plastic layer is an optically clear, epoxy polymer cast from aliphatic and/or aromatic epoxide monomers, a curing agent, a source of active hydroxyl groups and an accelerator, the epoxide monomer selected being such as to provide a refractive index of a predetermined value, the ratio of curing agent to epoxide being between 2:5 and 5:4, the ratio of curing agent to hydroxyl source being between 2:1 and 6:1, and the accelerator being at least 0.01%, but not over 1.0%.

Preferably, the aliphatic resin is a cycloaliphatic, the aromatic resin is a diglycidyl ether of bisphenol A, the hardener is hexahydro phthalic anhydride, the source of active hydrogen is propylene glycol and the catalyst is tin octoate. A preferred curing schedule calls for gelling the mixture at a temperature not over 100° C. for a time of at least 2 hours and curing the gel at a temperature up to 200° C., preferably at least 150° C., for at least 2 hours.

PRIOR ART

Applicants are not aware of more relevant prior art than that already noted, including the references cited therein.

DESCRIPTION OF THE DRAWING

In the accompanying drawing.

DESCRIPTION OF THE INVENTION

The present invention is essentially an improved version of the basic laminated lens structures disclosed in the prior Fretz, Jr. patent and pending application. In particular, the invention provides, as the organic plastic layer therein, an optically clear, epoxy casting that is essentially free of striations.

Our studies indicate that striations tend to occur during gelling of an epoxy casting mixture. They further indicate, as explained earlier, that the striations result from thermal gradients. These give rise to areas of varying refractive index that become frozen in during gelling. Striations may also form through other mechanisms, such as incomplete mixing. Accordingly, our invention is based on establishing conditions that largely avoid movement in the cast material as it gels.

We have found that, in addition to controlling the amount of curing agent in the mix, certain other controls must also be exercised to avoid striations. Thus, the source of hydroxyl groups should be maintained relatively constant. At too low hydroxyl level, the casting tends to stick in the mold. If the level is too high, there is a tendency to form numerous short chains that lead to a weak product.

Further, the gelling process should be conducted as rapidly as feasible, and at as low a temperature as practical. To this end, the amount of accelerator, or catalyst, should be controlled at a relatively high level. Also, the gelling temperature needs to be maintained as low as possible, while completing the process in a reasonable time.

Figure 1:
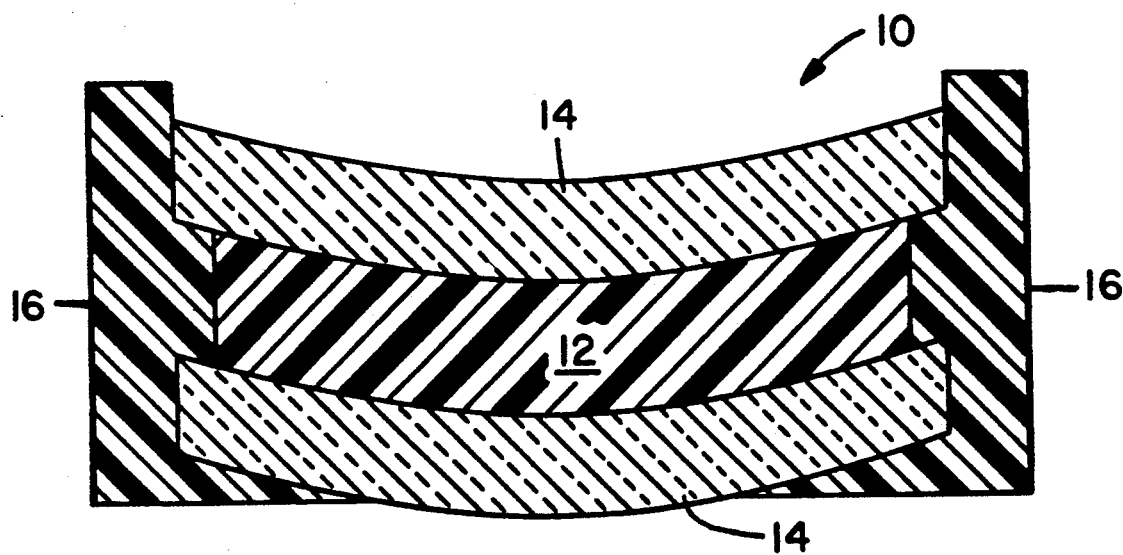
FIG. 1 is a side elevational view in cross-section of a casting mold 10 in which an epoxy mixture 12 is cast to be gelled and cured. Mold 10 is composed of glass mold sections 14 held in spaced relationship by a silicone gasket 16.
Figure 2:
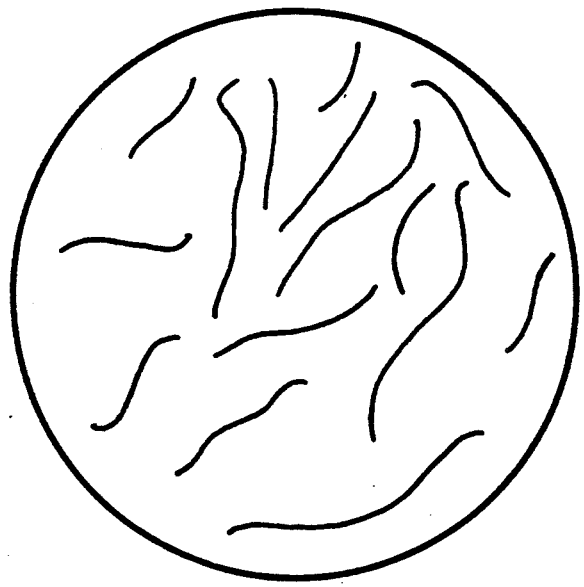
FIG. 2 is a schematic top view of an epoxy casting depicting striations which the invention is designed to avoid.

Initially, a casting mixture is prepared by combining the ingredients in a limited relationship to each other to form a casting mixture. This mixture is then cast in a mold, as shown in FIG. 1, gelled and cured to form the cast element. The ingredients are: an aliphatic and/or an aromatic epoxy monomer, an anhydride curing agent, a source of active hydroxyl groups and an accelerator, or catalyst.

An aliphatic epoxy provides clarity, color and UV stability, and is responsible for most of the physical and optical characteristics. A member of the cycloaliphatic epoxy family is preferred, although other aliphatic epoxides should produce satisfactory results. A high quality, readily available cycloaliphatic epoxy is ERL 4221 available from Union Carbide. This is a 3,4 epoxycyclohexylmethyl - 3,4 epoxy - cyclohexane carboxylate.

An aromatic epoxy is selected primarily to provide a higher refractive index than that which is characteristic of an aliphatic epoxy. Thus, an aliphatic epoxy with a refractive index of 1.506 may be mixed with an aromatic epoxy having an index of 1.547 in appropriate proportions to provide a desired intermediate value. For example, the index commonly sought for ophthalmic purposes is 1.523.

For present purposes, a high purity diglycidyl ether of bisphenol A, available from Dow Chemical Corporation under the designation DER 332, is preferred. However, other aromatic epoxies, including multifunctional resins such as the novolac resins, may also be used. As with any substitution, some experimentation may be necessary to obtain a desired combination of characteristics.

Hexahydro phthalic anhydride is the preferred curing agent for present purposes. This compound is a solid at room temperature, but melts to a water white liquid at about 45° C. Other anhydrides, or other curing agents, including catalytic curing agents, such as BF$_3$, may also be employed as hardeners, or curing agents.

The curing action with an anhydride requires that the anhydride react with the epoxide. This necessitates a source of active hydroxyl groups to open the anhydride ring, thereby rendering it reactive. The active hydroxyl level remains constant, since regeneration takes place during the polymerization reaction.

The hydroxyl can also react with the epoxide group to promote homopolymerization. Thus, there are two reactions taking place, only one using anhydride. Accordingly, the anhydride level must be adjusted to optimize the cure.

In general, we find that the ratio of reactive anhydride groups to reactive epoxide groups should range between 2:5 and 5:4. This ratio is expressed in terms of moles of anhydride and epoxide as determined on the basis of molecular weights. Thus, the moles of anhydride are based on the anhydride molecular weight, and the moles of epoxide are based on the epoxide equivalent weight (EEW) as supplied by the manufacturer, or determined by titration. For example, the EEW of ERL 4221 is 137 and that of DER 332 is 175.

The optimum value for any particular blend of epoxy resins needs to be determined experimentally. Thus, for a tin catalyzed reaction with ERL 4221 resin alone, a ratio of about 0.55 has been found desirable. For the aromatic resin DER 332, a value of 0.75 is desirable. The cure temperature and cure ratio may also affect the level of anhydride needed.

We prefer to use propylene glycol as a source of active hydroxyl groups. The amount employed affects the quality of the cure. If too much is present, the final product is poorly crosslinked, has a low Tg, and is a less tough material. When the active hydroxyl level is too low, the reaction is sluggish and an incomplete cure takes place.

The amount of propylene glycol also affects the optical distortions, or striations, in the casting. It is observed that, as the propylene glycol increases, the striations decrease. The propylene glycol level also affects the release of the casting from the mold. When the glycol level is reduced, the incidence of castings sticking to molds is increased. The suggested anhydride to hydroxyl level is between 2 and 6. Again, the optimum ratio needs to be determined experimentally. A preferred formulation has a value of about 5:2. The ratio of anhydride to hydroxyl groups source is also a mole ratio. It is based on the reactive groups and molecular weights of the particular anhydride and hydroxyl source employed. For example, in the case of hexahydro phthalic anhydride and propylene glycol, the hydroxyl or anhydride equivalent weights are, respectively, 154 and 38.

Propylene glycol may be replaced with other polyols, or with other sources of active hydroxyl groups. Such components, like the bisphenol A, may modify the refractive index. Accordingly, this must be taken into consideration where index control is critical.

The accelerator for the polymerization reaction is the final ingredient. This reduces the temperature needed to start the polymerization reaction. From that standpoint, it is desirable to increase the amount of catalyst employed. Such action is limited, however, by the need to maintain the mixture fluid long enough to permit filtering, or other intermediate steps. While as much as 1% may be tolerated in some cases, we prefer to employ levels from 0.01% to about 0.1%, based on the total mix.

We prefer to use tin octoate, also referred to as tin 2-ethylhexoate, as a catalyst or accelerator. The organic tin compound appears to have a minimal coloring effect and is compatible with the resin. Other types of catalysts that may be used are Lewis bases, such as the the tertiary amines, e.g. benzyl dimethyl amine, and Lewis acids, such as zinc octoate. The catalyst level will depend on the catalyst selected, and will need to determined for any specific situation.

To counter a yellow tint that may occur under some circumstances, a minute amount of a purple dye may be added as a decolorizer. Further, a commercially available ultra-violet absorber package may be added to prevent Yellowing with age, as well as providing eye protection.

The rigid, epoxy lens blank is produced by casting an epoxy resin mixture, as just described, in a glass mold that is treated with a mold release agent. We prefer a mold release material, such as Monocoat E 179, supplied by Chemtrend, Inc. The epoxy formulation is mixed using a mechanical stirrer. The solution is considered well mixed when no mix lines are visible while stirring. When the epoxy resin system is homogeneous, it is poured into a glass mold treated with the mold release agent. A silicone gasket is used to seal the mold, as shown in FIG. 1 of the attached drawing. The mold is then cured at a programmed rate: 55° C. for 16 hours, then slowly increase the temperature until the oven reaches 150° C., and hold for 4 hours. The mold is then cooled to room temperature, and the epoxy sample is removed from the mold.

SPECIFIC EMBODIMENTS

By way of further illustration, reference is made to TABLE 1, below, which shows several casting mixtures. These mixtures were mixed, poured into molds as shown in FIG. 1, and cured in accordance with the schedule set forth above. TABLE 1 also sets forth, for each example, the ratio of anhydride equivalent weight to epoxide equivalent weight (R1) and the ratio of anhydride equivalent weight to the hydroxyl equivalent weight (R2), the refractive index (REF.IN.), of the casting, and the appearance (APP.) of the casting with respect to freedom from striations or distortions. The five ingredients (ING.) in the casting mixtures are aliphatic monomer (ERL 4221), aromatic monomer (DER 332), hexahydro phthalic anhydride (HHPA), propylene glycol (PROP.GLY.) and tin octoate (SN. OCT.)

TABLE I

| ING. | 1 | 2 | 3 | 4 | 5 |
|---|---|---|---|---|---|
| ERL 4221 | 46.06 | 46.49 | 40.36 | 37.45 | 39.57 |
| DER 332 | — | 12.70 | 18.13 | 21.01 | 19.78 |
| HHPA | 51.76 | 37.11 | 36.92 | 37.77 | 37.52 |
| PROP.GLY | 2.13 | 3.66 | 4.55 | 3.73 | 3.09 |
| SN OCT. | 0.05 | 0.04 | 0.04 | 0.04 | 0.04 |
| EEW | 137 | 143.7 | 146.9 | 148.6 | 147.7 |
| R1 | 1.00 | 0.58 | 0.60 | 0.62 | 0.61 |
| R2 | 5.99 | 2.50 | 2.00 | 2.50 | 2.99 |
| REF.IN. | 1.507 | 1.516 | 1.522 | 1.523 | 1.523 |
| Tg. | 145 | 163 | 140 | 143 | 155 |
| APP. | — | EX. | EX. | Good | Fair |

| ING. | 6 | 7 | 8 |
|---|---|---|---|
| ERL 4221 | 45.10 | 33.32 | — |
| DER 332 | 5.05 | 22.91 | 52.16 |
| HHPA | 46.91 | 40.41 | 45.89 |
| PROP.GLY | 2.89 | 3.32 | 1.90 |
| SN OCT. | 0.04 | 0.04 | 0.05 |
| EEW | 140.1 | 150.3 | 175 |
| R1 | 0.85 | 0.70 | 1.00 |
| R2 | 4.00 | 3.00 | 5.96 |
| REF.IN. | — | — | 1.547 |
| Tg. | | | 170 |
| APP. | | | |

EX. = Excellent

Optionally, the foregoing example may include, as a decolorizer, three ppm of a purple dye available from from PYLAM PRODUCT CO., INC., Garden City, N.Y. under the designation PYLAKROME Blue violet 315901. Also, approximately one percent of an ultraviolet absorber pack, available from BASF, Parsippany, N.J. under the designation UVINUL-539, may be included.

We claim:

1. In a laminated, ophthalmic lens structure comprising an inorganic glass layer and a rigid, organic plastic layer wherein the organic plastic layer is an optically clear, epoxy polymer cast from an aliphatic and/or aromatic epoxide monomer, a curing agent, a source of active hydroxyl groups and an accelerator, and has a predetermined refractive index, the improvement wherein the ratio of curing agent to epoxide, by equivalent weights, is between 2:5 and 5:4, the ratio of curing agent to hydroxyl group source, by equivalent weights, is between 2:1 and 6:1, and the amount of accelerator is at least 0.01%, but not over 1.0%, of the mixture.

2. A laminated lens structure in accordance with claim 1 wherein the organic plastic layer has a refractive index of 1.523.

3. A laminated lens structure in accordance with claim 1 wherein the aliphatic epoxide monomer in the casting mixture is a cycloaliphatic.

4. A laminated lens structure in accordance with claim 3 wherein the monomer is 3,4-epoxycyclohexyl-methyl -3,4-epoxy-cyclohexane-carboxylate.

5. A laminated lens structure in accordance with claim 1 wherein the aromatic epoxide monomer is a diglycidyl ether of bisphenol A.

6. A laminated lens structure in accordance with claim 1 wherein the curing agent is an anhydride.

7. A laminated lens structure in accordance with claim 6 wherein the anhydride is hexahydro phthalic anhydride.

8. A laminated lens structure in accordance with claim 1 wherein the source of hydroxyl groups in the casting mixture is a polyol.

9. A laminated lens structure in accordance with claim 8 wherein the polyol is propylene glycol.

10. A laminated lens structure in accordance with claim 6 wherein the ratio of anhydride to the source of hydroxyl groups, by equivalent weights, is about 5:2.

11. A laminated lens structure in accordance with claim 1 wherein the accelerator in the casting mixture is a Lewis acid.

12. A laminated lens structure in accordance with claim 11 wherein the Lewis Acid is tin octoate.

13. A laminated lens structure in accordance with claim 1 wherein the accelerator does not exceed about 0.1% by weight of the mixture.

14. A laminated lens structure in accordance with claim 1 wherein the organic plastic layer further comprises a decolorizer.

15. A laminated lens structure in accordance with claim 1, wherein the organic plastic layer further comprises means for absorbing ultra-violet radiation.

* * * * *